United States Patent
Buqa et al.

(10) Patent No.: US 11,283,078 B2
(45) Date of Patent: Mar. 22, 2022

(54) AQUEOUS SLURRY FOR BATTERY ELECTRODES

(71) Applicant: Leclanche' S.A., Yverdon-les-Baines (CH)

(72) Inventors: Hilmi Buqa, Oberentfelden (CH); Werner Scheifele, Oberkirch (DE); Pierre Blanc, Morges (CH)

(73) Assignee: Leclanche' S.A., Yverdon-les-Bains (CH)

( * ) Notice: Subject to any disclaimer, the term of this patent is extended or adjusted under 35 U.S.C. 154(b) by 0 days.

(21) Appl. No.: 16/532,883

(22) Filed: Aug. 6, 2019

(65) Prior Publication Data

US 2020/0067099 A1 Feb. 27, 2020

Related U.S. Application Data

(63) Continuation of application No. 14/864,105, filed on Sep. 24, 2015, now abandoned, which is a continuation of application No. 13/485,108, filed on May 31, 2012, now abandoned.

(30) Foreign Application Priority Data

Aug. 3, 2011 (GB) ..................... 1113378

(51) Int. Cl.
*H01M 4/04* (2006.01)
*H01M 4/88* (2006.01)
*H01M 4/62* (2006.01)

(52) U.S. Cl.
CPC ......... *H01M 4/623* (2013.01); *H01M 4/0404* (2013.01); *H01M 4/622* (2013.01); *H01M 4/8828* (2013.01)

(58) Field of Classification Search
CPC .... H01M 4/623; H01M 4/0404; H01M 4/622; H01M 4/8828

USPC ......................................................... 156/60
See application file for complete search history.

(56) References Cited

U.S. PATENT DOCUMENTS 6,183,907 B1    2/2001  Barusseau et al.
2010/0304270 A1   12/2010  Amin-Sanayei et al.

FOREIGN PATENT DOCUMENTS

| CN | 101640264 A | 2/2010 |
|---|---|---|
| EP | 2071651 A1 | 6/2009 |
| JP | H11354125 A | 12/1999 |
| JP | 2000357505 A | 12/2000 |
| JP | 2002158012 A | 5/2002 |
| JP | 2005032632 A | 2/2005 |
| JP | 20080135334 A | 6/2008 |
| JP | 2008243411 A | 10/2008 |
| JP | 2008243441 A | 10/2008 |
| JP | 2011003529 A * | 1/2011 |

OTHER PUBLICATIONS

JP 2011-003529 A, machine translation, EPO espacenet. (Year: 2011).*
"Latex" ROMPP Online, Version 3.25.
Michael Groteklaes, "Slurry", ROMM Online, Version 3.25.
Wingender, Hans-Jochen Foth, Thomas Brock, "Dispersion".
H. Buqa et al., "Study of a styrene butadiene rubber and sodium methyl cellulose as binder for negative electrodes in lithium-ion batteries," Journal of Power Sources, 161 (2006), 617-622.
Lee et al., "Effect of poly(acrylic acid) on adhesion strength and electrochemical performance of natural graphite negative electrode for lithium-ion batteries", Journal of Power Sources, 161(1), 612-616 (2006).

* cited by examiner

*Primary Examiner* — Josephine L Chang
(74) *Attorney, Agent, or Firm* — 24IP Law Group USA, PLLC; Timothy R DeWitt

(57) ABSTRACT

A slurry or paste for the manufacture of electrodes for secondary batteries such as lithium ion containing electrochemical cells. The slurry comprises a water-based binder with CMC, SBR and PVDF as binder materials.

5 Claims, 2 Drawing Sheets

AQUEOUS SLURRY FOR BATTERY ELECTRODES

CROSS-REFERENCE TO RELATED APPLICATIONS

The present application is a continuation of U.S. patent application Ser. No. 14/864,105 filed Sep. 24, 2015, which is a continuation of U.S. patent application Ser. No. 13/485,108 filed May 31, 2012, which claims priority to United Kingdom Patent Application Ser. No. GB 1113378.2 filed by the present inventors on Aug. 3, 2011.

The aforementioned patent applications are hereby incorporated by reference in their entirety.

BACKGROUND OF THE INVENTION

Field of the Invention

The present invention relates to electrodes for secondary batteries. In particular, the present disclosure relates to slurries or pastes for the use in lithium ion containing electrochemical cells.

Introduction and Related Art

Electrodes for electrochemical cells are often manufactured by attaching an electrochemically active electrode material to a current collector. Known current collectors are rigid supports or flexible foils made from a conducting material. Examples for widely used current collector materials include copper or aluminum but other materials may be used. Methods to attach the electrochemical active electrode material to the current collector comprise lamination, gluing using adhesives or coating. These methods for manufacturing electrodes are widely used in the art.

A large variety of electrochemically activatable or active electrode materials is known for manufacturing anodes and cathodes in different battery systems and depending on the application of the battery. The electrochemical active electrode material is manufactured as a slurry or paste and subsequently coated onto the current collector or the slurry is manufactured as a self-supporting layer which is later attached to the current collector.

The slurry or paste usually comprises a mixture of an electrochemically activatable or active material and a binder material for forming the paste/slurry. Further components are often added, such as conductive additives (i.e. carbon black, graphite, carbon fibers, VGCF (vapour grown carbon fibers), etc.)

A large number of binder materials is known in the art. Polyvinylidene fluoride (PVDF) or polyvinyliden fluoride hexafluoropropylene (PVDF-HFP) copolymers have been found to have excellent chemical and mechanical properties when used as a binder material in a slurry for positive and negative electrodes. In particular, PVDF provides a good electrochemical stability and high adhesion to the electrode materials and to current collectors. PVDF is therefore a preferred binder material for electrode slurries. PVDF, however, has the disadvantage that it can only be dissolved in some specific organic solvent such as acetone has to be used which requires specific handling, production standards and recycling of the organic solvents in an environmentally friendly way. PVDF is also known for some long-term instability in the cell chemistry.

The use of aqueous solutions instead of organic solvents is preferred for environmental and handling reasons and water-based slurries have been considered. Possible binders for water-based slurries known in the art comprise carboxymethyl cellulose (CMC) and styrene-butadiene rubber (SBR). The publication of H. Buqa et al. "Study of a styrene butadiene rubber and sodium methyl cellulose as binder for negative electrodes in lithium-ion batteries" in Journal of Power Sources, 161 (2006), 617-622 describes the use of SBR and CMC as binders in aqueous solutions and their electrochemical performances compared to PVDF in organic solvent.

EP 0 907 214, corresponding to U.S. Pat. No. 6,183,907, compares acrylonitrile-butadiene rubber combined with CMC, combinations of CMC and SBR as binder in an aqueous solution to polyvinylidene fluoride in an organic solvent.

JP 2000 357505A describes the use of PVDF in an aqueous dispersion acting as binder material. The organic solvent in N-methyl-2-pyrrolidone (NMP) is added to the solution.

JP 2008 135334 suggests using a polymeric layer made from PVDF onto which a slurry comprising CMC and SBR as binder materials is coated.

These and other attempts have been made to combine PVDF with water-based slurries in order to use the known advantages of PVDF as a binder for electrode slurries without using organic solvents that require specific treatment during manufacture, but no successful implementation has been shown up to now.

It is an object of the present invention to overcome the disadvantages of prior art.

SUMMARY OF THE INVENTION

The present disclosure provides a composition for a slurry or a slurry for the manufacture of an electrode for an electrochemical cell. The electrochemical cell can be a lithium ion cell and can be a primary or a secondary battery. The slurry comprises a combination of at least three of polyacrylic acid (PAA), carboxymethyl cellulose (CMC), styrene butadiene rubber (SBR) and polyvinylidene fluoride (PVDF) in an aqueous solution. The slurry further comprises an electrochemical active or activatable compound. In this way, PVDF can be used in a water-based slurry, which allows for easier handling and less environmental pollution and reduced costs while keeping the chemical and electrochemical advantages of PVDF, i.e. the electrochemical stability, possibility of lamination, lifetime stability, reduced binder content enables higher C-rates, etc. The combination of PVDF with SBR and CMC or PAA has also good adhesive properties allowing lamination and/or coating of the slurry without the use of additional adhesives.

It has been found that the combination consisting of PVDF with CMC and SBR in an aqueous solution can be used as binder in a positive or negative electrode slurry, wherein the CMC and SBR are used as binder and PVDF is used as lamination agent.

Alternatively, CMC or SBR may be replaced by PAA as binder material. A combination of PVDF with PAA and SBR can equally be used in a positive or negative electrode slurry. PAA may be used to reduce the PH of the slurry which helps to avoid or suppress corrosion.

A combination of PVDF with SBR, CMC and PAA may also be used in an aqueous solution combining the advantages of CMC and PAA.

A latex may be dispersed in this aqueous solution to stabilise the PVDF in the aqueous solution. Using a PVDF-latex dispersion makes it possible to use PVDF in aqueous solutions, keeping the advantages of PVDF as lamination agent and in the same time avoiding the use of organic solvents.

No organic solvents or other additional components besides latex are needed or used to dissolve the PVDF in the aqueous solution.

The aqueous solution is de-ionized water.

A concentration of about 0.5% to about 10% by weight of each one of the CMC, SBR and the PVDF may be used for a stable slurry with good chemical and electrical properties.

The composition of the slurry does not require organic solvents, but such solvents could be used without changing the spirit of the patent. The slurries may be free of any organic solvent and the expensive and restrictive and complicated handling of organic solvents is avoided or reduced during the manufacture of the slurry.

In many cases it is important to have a water free effective electrode material before the electrolyte is added. The slurry or the manufactured electrode may therefore be dried.

The electrochemically activatable material may comprise at least one of graphite, titanate, lithium metal oxides such as LMO (lithium manganese oxide), Li—NCA (lithium nickel cobalt aluminium oxide), LCO (lithium cobalt oxide), LNCM (lithium nickel cobalt manganese oxide), LFP (lithium iron phosphate) and other metal oxides or other materials known in the art, as well as their blends. The slurry may be used for a positive electrode and/or for a negative electrode.

The present disclosure also relates to a method or the manufacture of an electrode for an electrochemical cell. The method comprises preparing a slurry comprising a combination of at least three of the PAA CMC, SBR and PVDF in an aqueous solution, coating or laminating the slurry on a current collector, and drying the slurry. Latex may be added to the aqueous solution to stabilise the slurry.

Latex may be used in a dispersion with the PVDF in the aqueous solution. The aqueous solution may further comprise at least two of the PAA; CMC, SBR may be added to the dispersion The method may further comprise adding a non-aqueous electrolyte to the electrode.

The method and the slurry have the advantage that only aqueous solutions are used that can be easily handled and a less cost-intensive use.

BRIEF DESCRIPTION OF THE FIGURES

The present invention as defined by the claims will now be described with respect to detailed examples and with reference to the attached figures in which:

DETAILED DESCRIPTION

Figure 1:
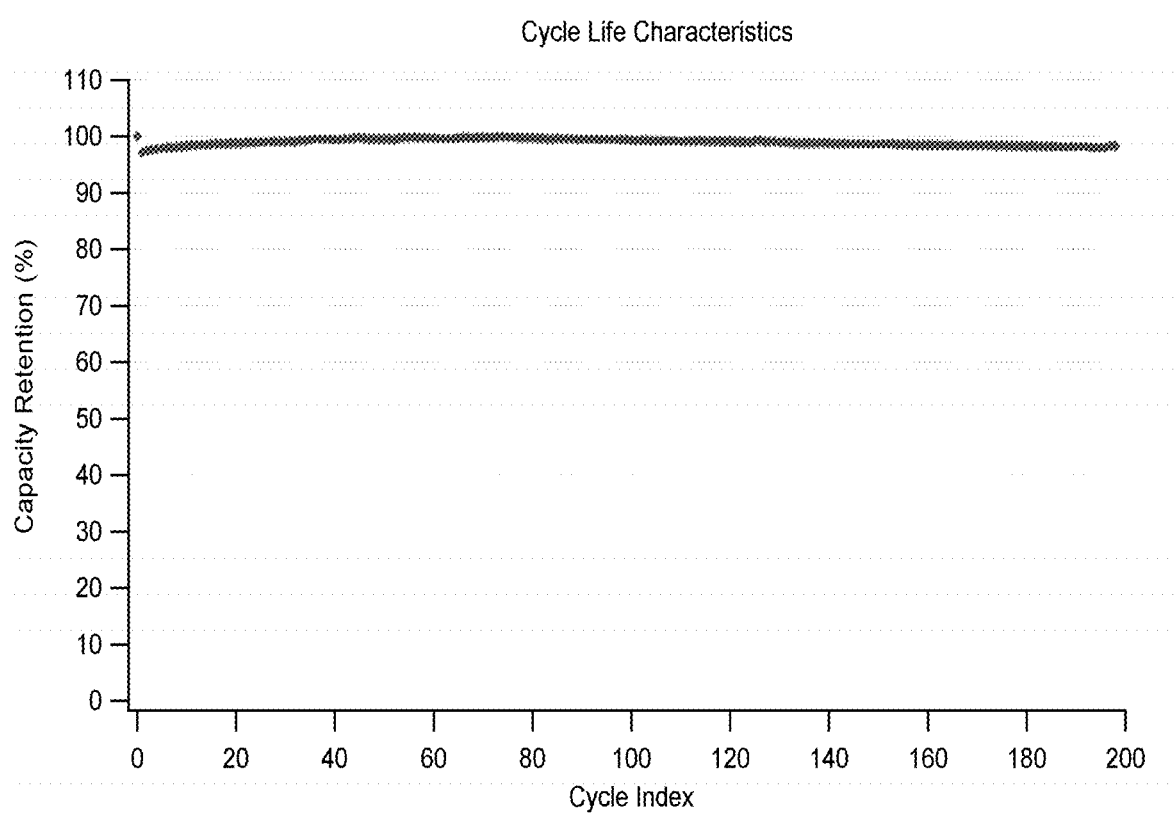
FIG. 1 shows cycle life characteristics for electrochemical cells containing Li—NCO cathodes and graphite anode prepared with water-based binder mixture.

An electrochemical cell according to the present disclosure can be prepared by standard methods known to a person skilled in the art. It is common knowledge to a person skilled in the art to use slurries for manufacturing positive or negative electrodes i.e. cathodes or anodes. The slurry may be coated onto a current collector. The current collector can be a metal foil and can comprise materials such as copper or aluminium, but other current collectors can be used with the present invention.

A slurry according to the present disclosure is prepared by mixing a binder with an active electrode material in an aqueous solution. Further components may be added.

The binder comprises a composition of carboxymethyl cellulose (CMC), styrene butadiene rubber (SBR) as binder and polyvinylidene fluoride (PVDF) as lamination agent. No other binder materials are used. Alternatively or in addition to CMC, polyacrylic acid (PAA) may be used to reduce the PH of the slurry. The total amount of binder in the slurry can be about 0.5% to about 30% by weight. Good results have been obtained with a total amount of binder in the slurry of about 10% by weight. The binder can be mixed in an aqueous solution made from de-ionized water. Latex at a concentration of about 0.5-10% may be added to stabilize the aqueous PVDF dispersion.

The slurry comprises an active electrode material and other components such as carbon black and optionally further additives.

Example for anode active electrode material may be graphite. Examples for a cathode active electrode material comprises LFP, LNCM, LCO, Li—NCA, LMO or other metal oxides and their blends.

Example 1

Anode Electrode Slurry

A graphite electrode slurry may comprise 2% CMC or PAA, 5% SBR, 3% PVDF, 2% carbon black and 88% graphite. The above components may be mixed to a slurry in an aqueous solution. The aqueous solution may be deionised water. Latex may be added to the solution in order to maintain the PVDF in a stable dispersion. The materials used are commercially available. No other materials are used. The water contents depends on active materials, binder and other conductive materials and their concentration used in the slurry.

Example 2

Cathode Electrode Slurry

A cathode electrode slurry may be mixed by using 4% CMC or PAA, 6% SBR, 3% PVDF, 6% carbon black and 88% by weight of LFP or another metal oxide. Latex may be added to the solution in order to maintain the PVDF in a stable dispersion. The Li—NCO presented in this draft is prepared using PVDF as Binder and acetone as a solvent. Nevertheless, the Li—NCO electrodes can be prepared using: NMP, water, acetone, DMAC or other organic solvents.

The above slurries have been coated on an anode current collector and onto a cathode count collector, respectively. The current collector can be made from any known material such as for example aluminium or copper and can be in form of a foil. The cathode and the anode produced in this way were inserted in an electrochemical cell, separated by a separator.

Electrochemical cells produced in such a manner have been tested for their cycle life characteristics and for their discharge rate capability behaviour depending on the temperature.

FIG. 1 shows cycle life characteristics for electrochemical cells containing Li—NCO cathodes and graphite anodes prepared with a water-based binder mixture. The slurry is prepared using PVDF as a binder and acetone as a solvent. The capacity retention in constant over at least two hundred charging and recharging cycles indicating a good cycle life of electrochemical cells based on water-based slurries.

Figure 2:
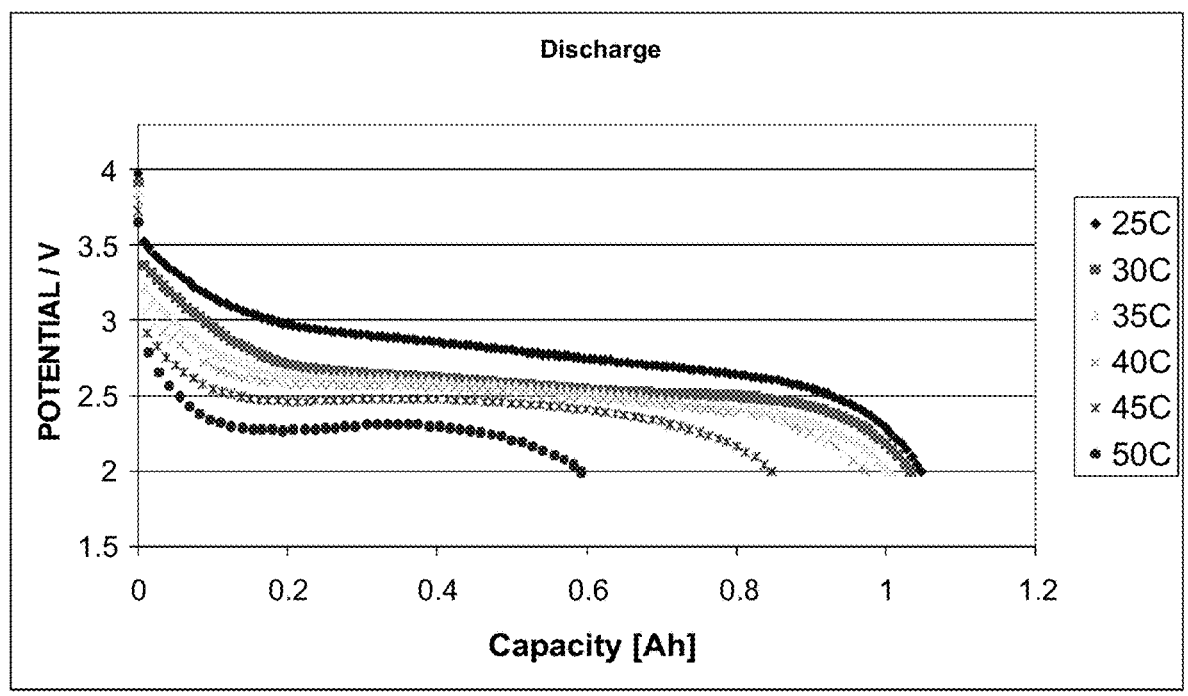
FIG. 2 shows a discharge rate capability behaviour of the Li—NCO/Graphite electrochemical cell of FIG. 1.

FIG. 2 shows a discharge rate capability behaviour of Li—NCO/graphite cells. The graphite electrodes were prepared with the water-based binder mixture of example 1. The results indicate that there are no differences in using water-based slurries compared to slurries based on organic solvents or other slurries. The use of the water-based slurries therefore allows to reduce or avoid the use of organic solvents in the slurries facilitating the manufacture of the slurries.

It should be noted that organic solvent free slurries can be prepared. However, a certain concentration of organic solvents can be used in some applications of the present disclosure. The organic solvent is, however, not necessary for dissolving the binder material and the binder can be used in the aqueous solution.

While the above description of a detailed example has been given for illustrative purposes only, other active electrode materials can be used with, CMC, SBR and PVDF as binder materials in an aqueous solution. A person skilled in the art will optimize the concentrations of CMC, SBR and PVDF depending on the active electrode material used and on the desired properties of the slurry.

The invention claimed is:

1. A method for the manufacture of an electrode for an electrochemical cell, comprising the steps of:
   preparing a slurry comprising mixing one of polyacrylic acid or carboxymethyl cellulose, in an aqueous solution, with styrene-butadiene rubber as binder in an aqueous solution, polyvinylidene fluoride, and carbon black and at least one selected from the group comprising graphite, titanate, and lithium metal oxides wherein the total amount of binder in the slurry is about 10% by weight; and
   coating or laminating the slurry on a current collector.

2. The method of claim 1, wherein preparing the slurry comprises dispersing latex in the aqueous solution for stabilizing the aqueous solution.

3. The method of claim 1, further comprising the step of adding a non-aqueous electrolyte.

4. The method of claim 1, further comprising drying the slurry.

5. The method of claim 1, wherein the concentration of each one of the polyvinylidene fluoride; the polyacrylic acid or the carboxymethyl cellulose; and the styrene-butadiene rubber is about 0.5% to about 10% by weight.

* * * * *